United States Patent [19]

Amano et al.

[11] Patent Number: 4,984,167

[45] Date of Patent: Jan. 8, 1991

[54] CONTROL APPARATUS AND METHOD FOR AN INTERNAL COMBUSTION ENGINE

[75] Inventors: Matsuo Amano, Hitachi; Masami Shida, Mito, both of Japan

[73] Assignee: Hitachi, Ltd., Tokyo, Japan

[21] Appl. No.: 305,699

[22] Filed: Feb. 3, 1989

[30] Foreign Application Priority Data

Feb. 5, 1988 [JP] Japan .................................. 63-23694

[51] Int. Cl.$^5$ ......................... F02M 51/00; F02P 3/00
[52] U.S. Cl. ............................... 364/431.04; 123/487;
123/488; 364/431.05
[58] Field of Search ............... 123/480, 481, 487, 488;
364/431.04–431.05

[56] References Cited

U.S. PATENT DOCUMENTS

| | | | |
|---|---|---|---|
| 4,469,071 | 9/1984 | Bassi et al. | 123/481 |
| 4,530,332 | 7/1985 | Harvey et al. | 123/481 |
| 4,541,387 | 9/1985 | Morikawa | 123/481 |
| 4,633,838 | 1/1987 | Fukui | 123/488 |
| 4,655,187 | 4/1987 | Gravestock | 123/481 |
| 4,791,569 | 12/1988 | Suzuki | 364/434.04 |
| 4,875,452 | 10/1989 | Hara et al. | 123/488 |

FOREIGN PATENT DOCUMENTS

A212652  9/1986  Japan .

*Primary Examiner*—Felix D. Gruber
*Attorney, Agent, or Firm*—Antonelli, Terry, Stout & Kraus

[57] ABSTRACT

In a control apparatus for an internal combustion engine for receiving outputs of a crank angle sensor, air flow sensor, etc., calculating control values from these outputs using a microcomputer to actuate actuators; calculated timings at which the respective actuators are deactuated are compared in advance with each other, the control value for the actuator which should be deactuated earliest is stored in an output compare register, and a deactuation signal for the actuator is generated with count matching of two inputs to a comparator of the output compare register. Thus the respective actuators are sequentially controlled.

15 Claims, 15 Drawing Sheets

CONTROL APPARATUS AND METHOD FOR AN INTERNAL COMBUSTION ENGINE

FIELD OF THE INVENTION

The present invention relates to a control apparatus for an internal combustion engine, and more particularly to a control apparatus for an internal combustion engine suitable for control of a plurality of actuators using a reduced number of output-compare registers.

BACKGROUND OF THE INVENTION

As described in Japanese Patent Laying-open specification JP-A-61-212652, now U.S. Pat. No. 4,633,838 a conventional control apparatus of this type includes a plurality of output compare registers to control an equal number of actuators wherein a respective register controls each actuator with a signal indicative of count matching therefrom.

Namely, in order to actuate the plurality of actuators, a like number of output compare registers are required, so that it is necessary to employ a multiplicity of output compare registers each including a free-running counter, a register and a comparator, in a limited space on a single chip microcomputer, and hence it is difficult or impossible to provide on the chip other elements to perform other important functions.

SUMMARY OF THE INVENTION

It is an object of the present invention to provide a control apparatus and method for an internal combustion engine which is capable of driving many actuators using a limited or less number of output compare registers without sacrificing the ability to perform other important functions.

In order to achieve the above object, according to the present invention, an actuator to be actuated among a plurality of actuators is determined in accordance with input reference pulses. Information as to the timing at which the actuator is to be actuated is set in an output compare register. When the number of input reference pulses matches the set timing data, the corresponding actuator is actuated. An actuator to be deactuated among the plurality of actuators also is determined in accordance with input reference pulses. Information as to the timing at which the actuator is to be deactuated is set in an output compare register different from the input compare register. When the number of input reference pulses matches the set timing data, the corresponding actuator is deactuated.

DESCRIPTION OF THE PREFERRED EMBODIMENT

Figure 1:
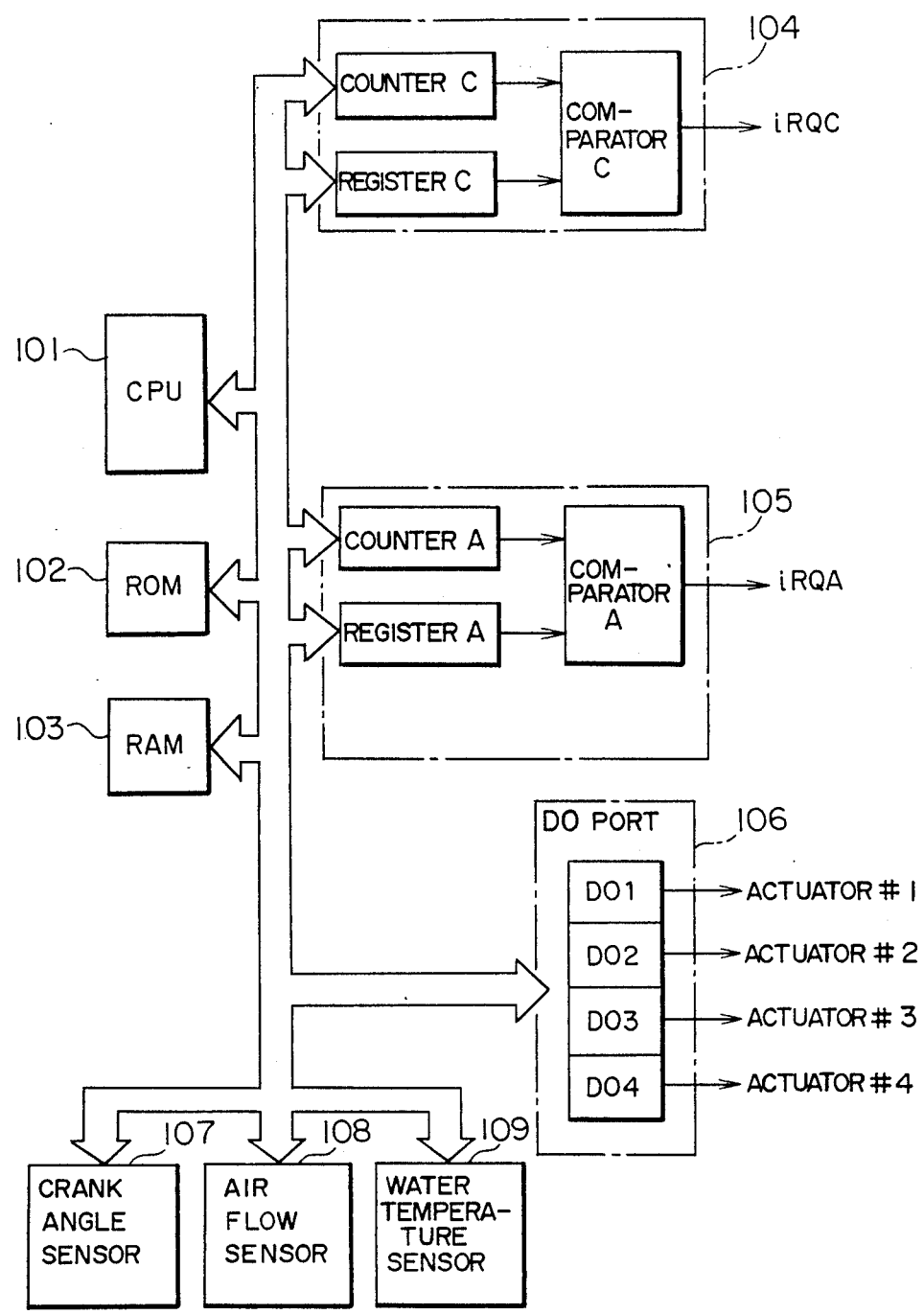
FIG. 1 is a schematic of a first embodiment of the present invention using output compare registers.

One embodiment of the present invention will now be described with reference to FIGS. 1-5. The arrangement of FIG. 1 includes a microprocessor (CPU) 101, a ROM 102, a RAM 103, output compare registers 104, 105 and a digital output (DO) port unit 106. Output compare register 104 includes a counter C, a register C and a comparator C. Similarly, output compare register 105 includes a counter A, a register A and a comparator A.

CPU 101 receives the outputs of a crank angle sensor 107, an air flow sensor 108 and a water temperature sensor 109, and interrupt signals iRQA and iRQC, processes the output information in accordance with a program stored in the ROM 102, and outputs the processed results as a control signal to the output compare registers 104 and 105 and the DO port unit 106. RAM 103 is connected through a bus line to CPU 101, ROM 102, DO port unit 106, output compare registers 104 and 105 and stores state quantities and results of arithmetic operations. DO port unit 106 is a memory device provided to operate the actuators. Usually, if the contents of each DO port are of "High" level, it indicates that the associated actuator is operated while if the contents of each port are of "Low" level, it indicates that the associated actuator is not actuated and is at rest. While it is shown that four actuators #1-#4 are to be used in FIG. 1, there may be provided a different number of actuators because the present invention relates to control of a plurality of actuators.

Figure 2:
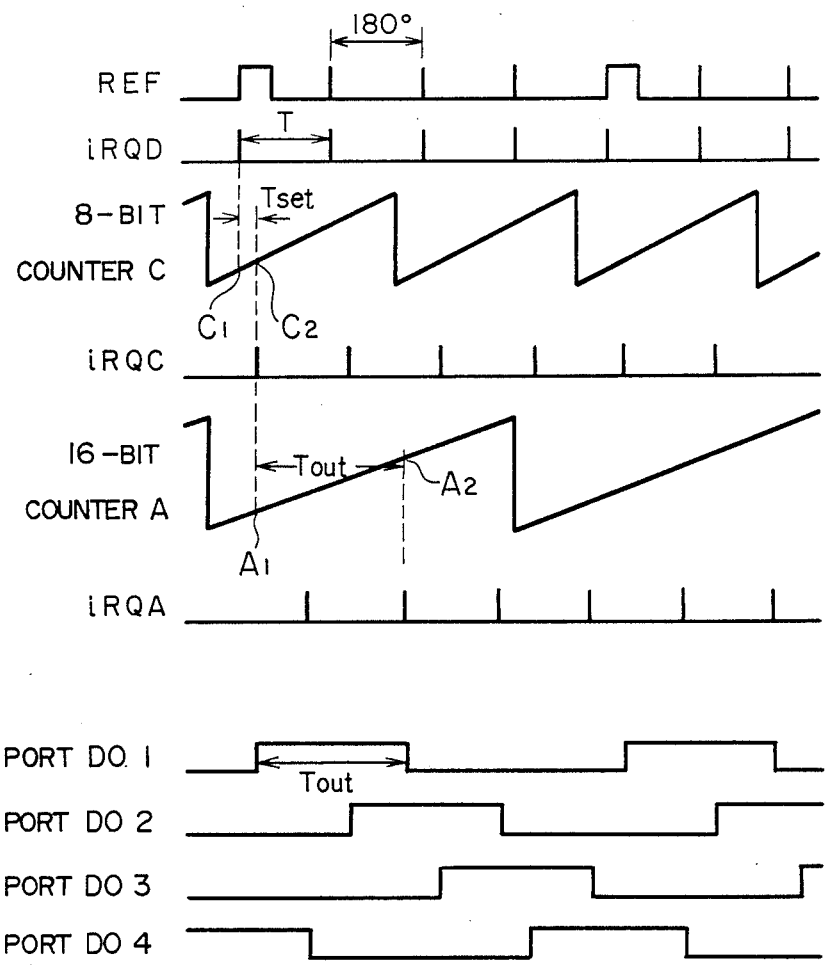
FIG. 2 is a sequence diagram illustrating the operation of the first embodiment.
Figure 3:
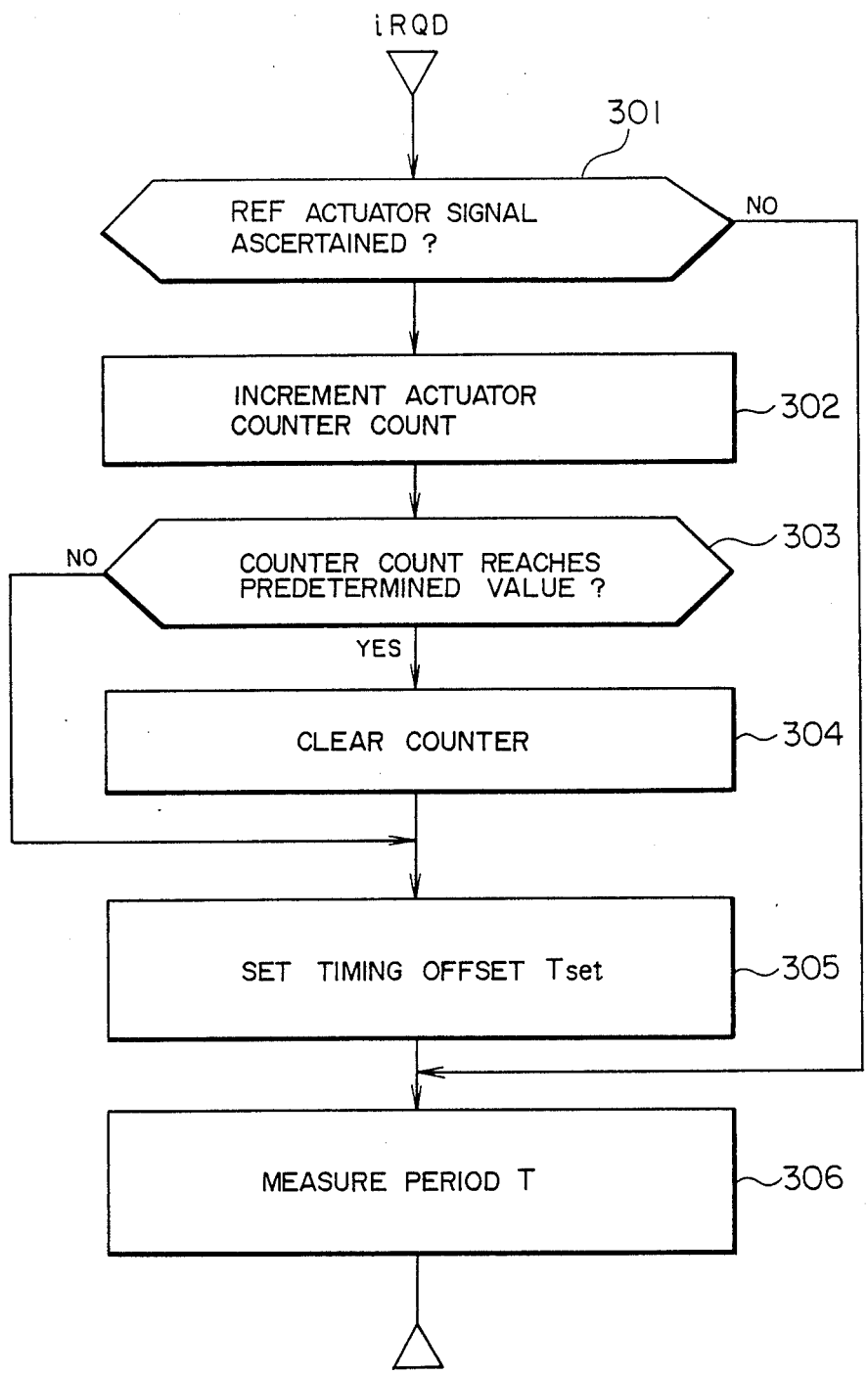
FIG. 3 is a flowchart of an interruption sequence initiated by a REF pulse in the first embodiment.
Figure 4:
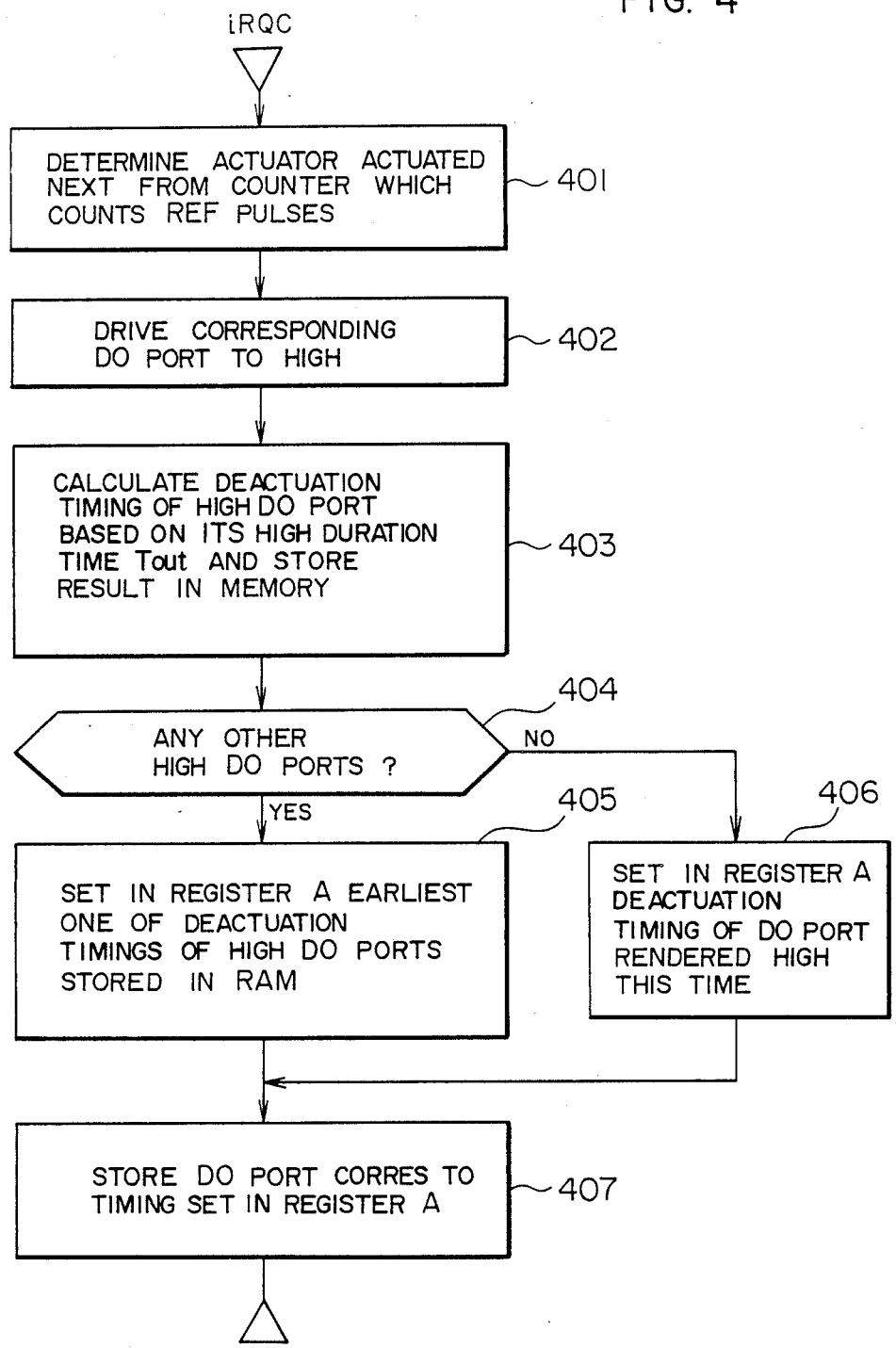
FIG. 4 is a flowchart indicating the drive of actuators of the first embodiment performed by an interruption.
Figure 5:
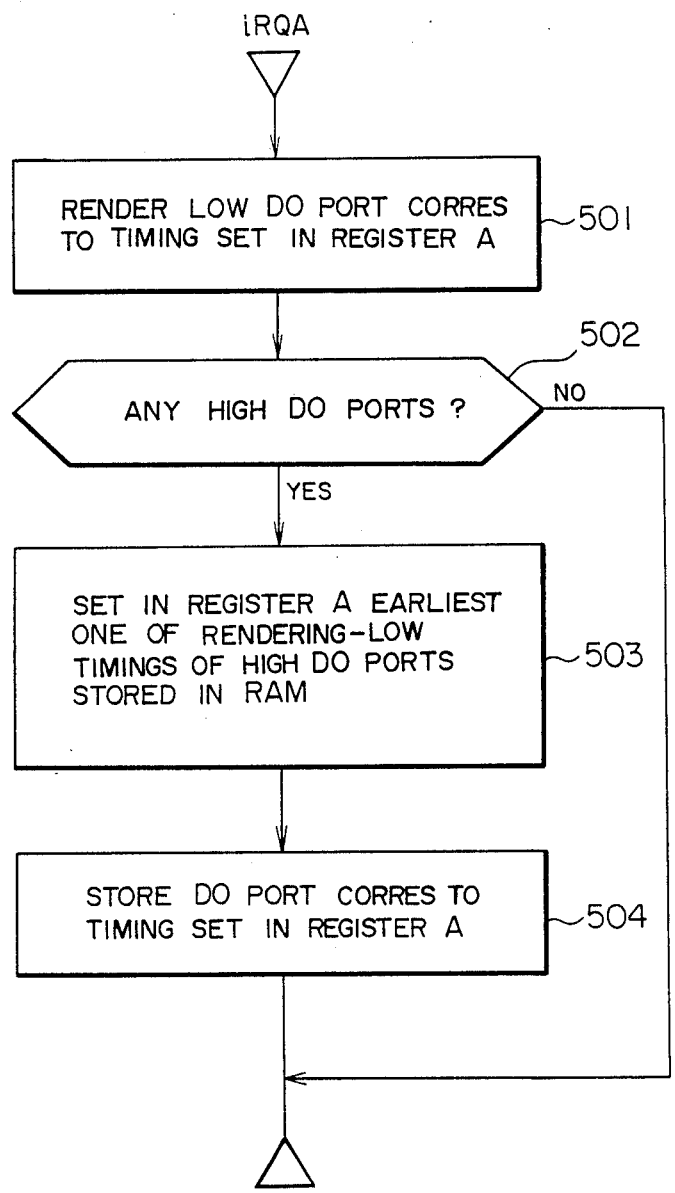
FIG. 5 is a flowchart of an interruption sequence initiated by a coincidence signal from a compare register in the first embodiment.

The operation of the present invention will now be described with reference to FIG. 2. An interrupt signal iRQD is generated in response to a reference signal or a REF pulse and is inputted to CPU 101. The REF pulse may be a periodic one generated, for example, at intervals of a unit time or may be generated synchronously with the rotation of the engine. Alternatively, it may be a signal produced synchronously with the rotation of the engine and processed by CPU 101 in any desired manner. The interrupt signal iRQD is produced by a predetermined program when CPU 101 ascertains that it has received, for example, a reference signal. The interruption to CPU 101 may be performed by the output of an external interrupt signal generator which comprises a memory, determination circuit and oscillator and produced in response to a REF pulse. When the interrupt signal iRQD is inputted to CPU 101, CPU 101 calculates a timing offset Tset to actuate an actuator and writes the calculated value into the register C of output compare register 104. The actuation of the actuator should be generally understood to be performed on a time basis. Tset may be of a physical quantity in a wider sense, for example, it may include a rotational angle of the engine. The above-mentioned timing must be understood as a concept corresponding to that. CPU 101 determines which of the actuators should be actuated. This determination is performed, for example, in response to reference pulses inputted thereto. For example, it is determined on the basis of data on the actuated state of an actuator stored temporarily in RAM 103 in accordance with a program written in ROM 102. After iRQD is inputted to CPU 101, the processing is performed, for example, as shown in FIG. 3. With an offset quantity Tset set in register C, comparator C compares the set offset quantity and the count of counter C. Counter C increments or decrements by one its count in response to a signal of a predetermined period. The signal of a predetermined period may be a signal generated, for example, at predetermined intervals of time or may be a signal generated at a predetermined angular rotation of the engine. Alternatively, it may be a processed signal generated by CPU 101. If comparator C recognizes that the count of counter C reaches the value set in register C, it produces an interrupt signal iRQC, which is then inputted to CPU 101, by which CPU 101 outputs a signal which renders "High" the DO port of an actuator to be actuated. CPU 101 calculates a time duration during which each actuator is to be actuated in accordance with the program stored in ROM 102, and calculates Tset for each actuator and a timing Tout at which each actuator is to be deactuated. Like Tset, Tout may be a physical quantity which is not only a time duration but also may represent a rotational angle of the engine. The term "timing Tout" expressed here is meant to have a wide concept which may include a physical quantity other than time. CPU 101 compares the respective timings at which the actuators are to be deactuated, determines which of the actuators should be deactuated earliest, and writes data of a timing Tout at which the determined actuator is deactuated into the register A of output compare register 105. The determination as to which of the actuators should be deactuated is performed by CPU 101 which compares data on the respective operational states of the actuators stored in RAM 103 in accordance with the program in ROM 102. After iRQC is inputted to CPU 101, the processing of CPU 101 is as shown, for example, in FIG. 4. When CPU 101 writes the value of Tset into register A, comparator A compares the count of counter A with Tout. Counter A receives a signal at predetermined periods. This signal may be a signal generated at each unit time, a signal generated at each rotational unit angle of the engine, or a signal obtained by the processing of these signals by CPU 101. If the count of counter A reaches the value of register A, output compare register A outputs an interrupt signal iRQA, which is then inputted to CPU 101 at which timing the DO port is rendered Low which corresponds to an actuator which is determined to be deactuated by CPU 101, and thus that actuator can be deactuated. After iRQA has been generated, the processing by CPU 101 is performed, for example, as shown in FIG. 5. The actuator for control of the engine may be, for example, a fuel injection valve, a spark timing control device or an EGR control valve. While four actuators to be controlled are shown in FIG. 1, any number of, for example, 6 or 8, actuators may be controlled according to the present invention.

The CPU operation illustrated in FIG. 2 will now be described using the flowcharts of FIGS. 3-5. An interrupt signal iRQD is generated in response to a REF pulse. In FIG. 3, it is determined whether a reference signal to start up an actuator is ascertained at step 301. If so, the counter is incremented at step 302 and the control sequence then proceeds to step 303 where it is checked to see if the count of the counter arrives at a predetermined value (max value). If so, the counter is cleared for initialization at step 304. The CPU determines an actuator to be actuated. At step 305 a timing offset Tset to actuate the injector from a REF pulse is set. FIG. 4 is a flowchart of a control sequence performed after the generation of interrupt signal iRQC. At step 401 an actuator to be activated next is determined from the count of the counter which counts REF pulses. Thus the appropriate DO port is rendered High at step 402 in response to generation of IRQC.

At step 403 a "deactuation" timing at which the DO port is switched from "High" to "Low" is calculated in consideration of the duration time Tout during which that DO port is maintained at a High state and the timing data is stored in RAM 103. At step 404 it is determined from the data stored in RAM 103 whether there are any other High DO ports. If so, the earliest one of the deactuation timings of the High DO ports stored in RAM 103 is set in register A at step 405. At step 404 if no other DO ports are determined as being High, the deactuation timing of the DO port rendered High this time is set in register A at step 406. At step 407 data on the DO port corresponding to the timing set in register A is stored and thus the sequence is terminated.

FIG. 5 is a flowchart of operations performed after interrupt signal iRQA is generated. At step 501 the DO port corresponding to the timing data set in register A is rendered Low. At step 502 it is determined whether there are any High DO ports. If not, control is terminated. If there is a High DO port, the earliest one of the timings at which the High DO ports (the data on which is stored in RAM 103) are rendered Low is set in register A at step 503. At step 504 data concerning the DO port corresponding to the timing data set in register A is stored and control is terminated.

In the above embodiment, the program controls the actuation and deactuation of the plurality of actuators, so that a small number of output compare registers can control many actuators and the single chip microcomputer can realize a high-function control.

Figure 6:
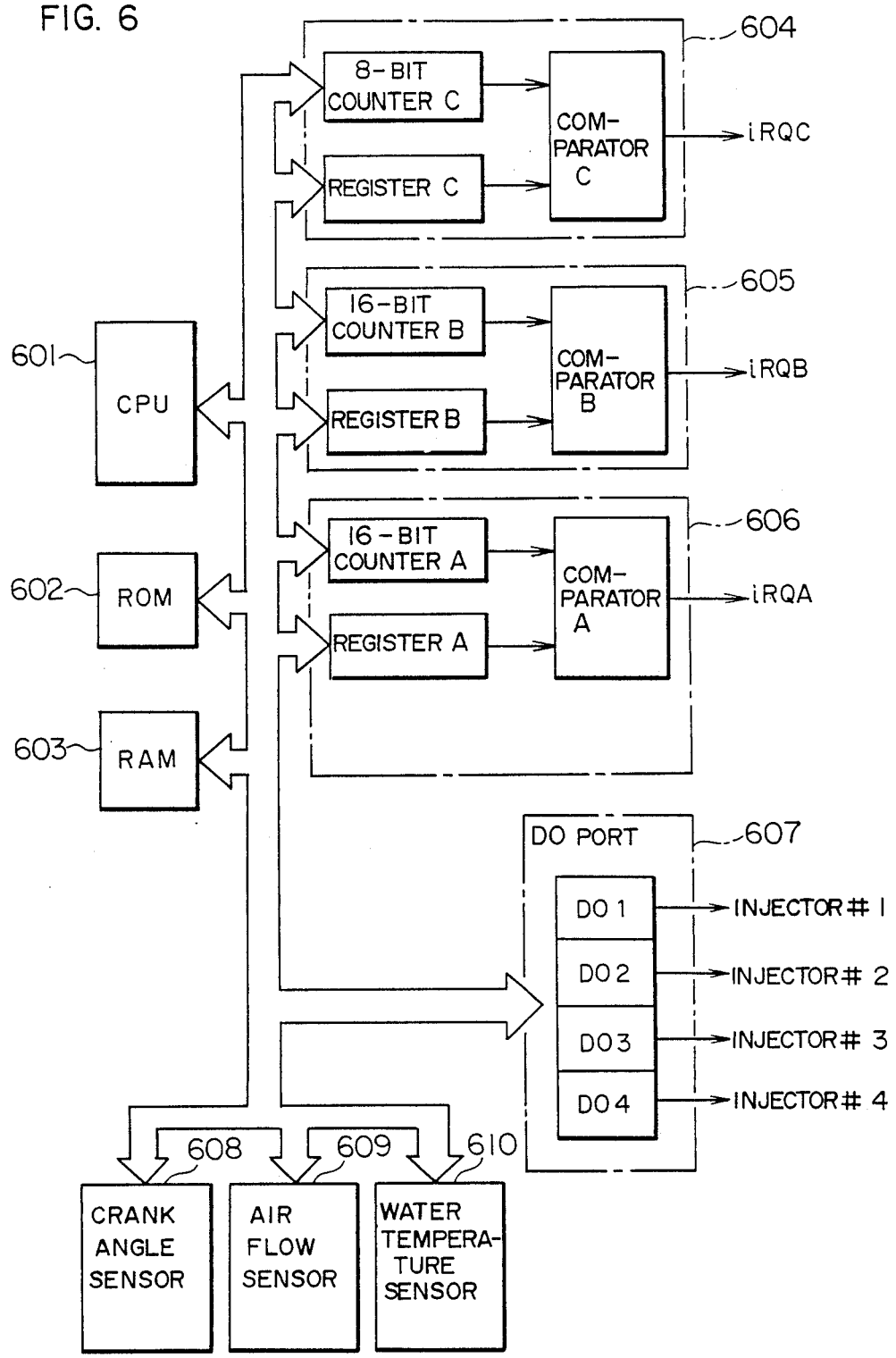
FIG. 6 illustrates a schematic of a second embodiment of the present invention including registers.

A second embodiment of the present invention will now be described with reference to FIGS. 6-10. It uses three output registers to control four injectors #1 to #4. They may be used to drive other actuators for spark timing control, EGR control, etc. By increasing the number of output registers, four or more actuators may be controlled. In FIG. 6, the control apparatus includes a microprocessor (CPU) 601, a ROM 602, a RAM 603, output compare registers 604, 605 and 606, and a digital output (DO) port 607. CPU 601 receives the outputs of a crank angle sensor 608, an air flow sensor 609 and a water temperature sensor 610 and performs arithmetic operations on these outputs. Output compare register 604 includes a 8-bit counter C, a register C and a comparator C; output compare register 605 includes a 16-bit counter B, a register B and a comparator B; and output compare register 606 includes a 16-bit counter A, a register A and a comparator A. Output compare register 606 is associated with DO ports D01 and D02 which control injectors #1 and #2, respectively, while output compare register 605 is associated with DO ports D03 and D04 which control injectors #3 and #4, respectively. Comparators 604, 605 and 606 produce interrupt signals iRQC, iRQB and iRQA, respectively, when the two inputs to the respective comparators match.

Figure 7:
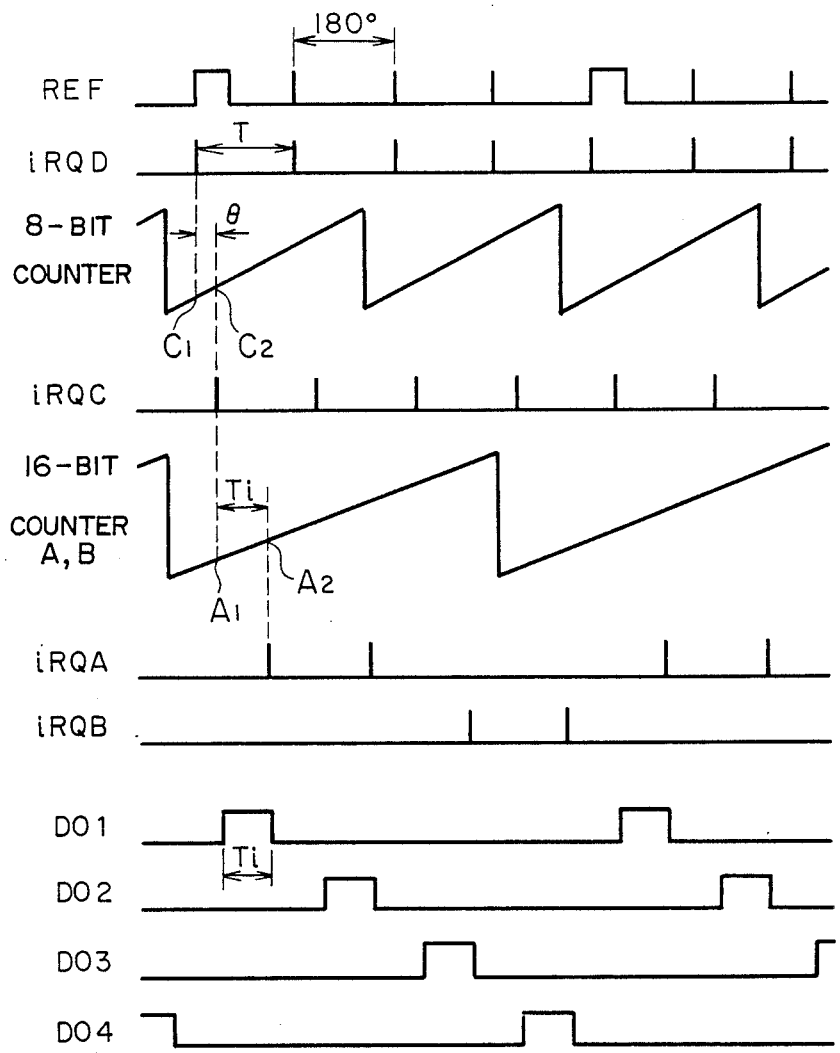
FIG. 7 is a sequence diagram explaining the operation of the second embodiment using three output compare registers.

The operation of the embodiment will be described with reference to FIG. 7. A reference angle signal REF pulse is generated at each 180° angular rotation of an engine if the engine has four cylinders and a cylinder determining signal of a wider pulse width is generated at each 720° angular rotation of the engine. The successive cylinder determining signals realize a sequential injection in which respective injectors for the cylinders are driven sequentially. An interrupt signal iRQD is generated at a rise of each REF pulse. The engine speed N can be calculated by measuring the period T of the interrupt signal iRQD. A count value C2 which comprises the current count C1 of 8-bit counter C+ a timing angle $\theta$ counted from the interrupt signal iRQD at which an injector starts its fuel injection is set in register C. Thus, output compare register 604 generates interrupt signal iRQC which drives an injector when the two inputs to comparator C match. If the REF pulse is a cylinder determining signal, DO port D01 which drives the injector #1 is rendered High. When iRQC is generated, a count value A2 comprising a fuel injection time interval Ti+ count A1 of the 16-bit counter A is set in register A. The fuel injection time interval Ti is calculated in accordance with, for example, engine speed and intake air quantity. The value A2 determines a timing at which the injector #1 is deactuated. When the value A2 is calculated, timings at which other injectors under injection are deactuated are checked in order to prepare for control of an injector having the earliest deactuation timing. Deactuation of injectors #3 and #4 in response to interrupt signal iRQB may be controlled similarly.

Figure 8:
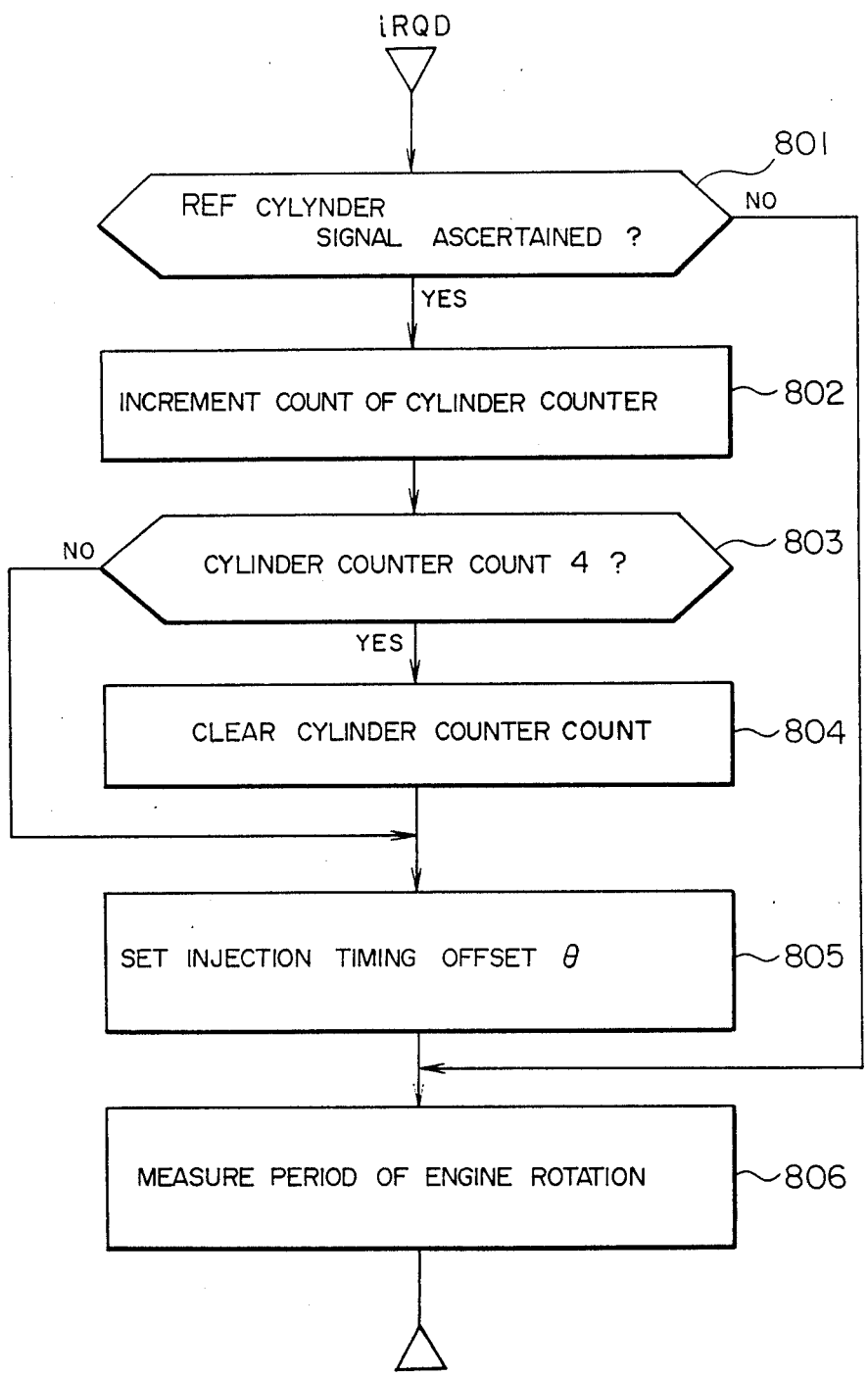
FIG. 8 is a flowchart of an interruption sequence initiated by a REF pulse in the second embodiment.

The operation of the embodiment illustrated in FIG. 7 will now be described with reference to the flowcharts of FIGS. 8-10. FIG. 8 shows a flowchart of operations performed after interrupt signal iRQD is generated in response to a rise of a REF pulse. At step 801 it is determined whether a cylinder determining signal (see FIG. 7) is ascertained. If so, the cylinder counter is incremented at each interruption at step 802 and control passes to step 803. If the count of the cylinder counter becomes 4 in the case of a 4-cylinder engine, the next cylinder determining signal is generated, so that the cylinder counter is cleared at step 804. The cylinder counter determines an injector to be actuated. Interrupt signal iRQA is used at the counts 0 and 1 of the cylinder counter, and interrupt iRQB is used at the counts 2 and 3 of the cylinder counter. At step 805 an offset $\theta$ for the injection timing from the REF pulse is set in 8-bit register C. By this setting, an interrupt iRQC is generated, which is described with reference to FIG. 7. At step 806 the period of engine rotation T is measured. Setting the offset $\theta$ at step 805 may be performed before step 802 if it is not related to the cylinders.

Figure 9:
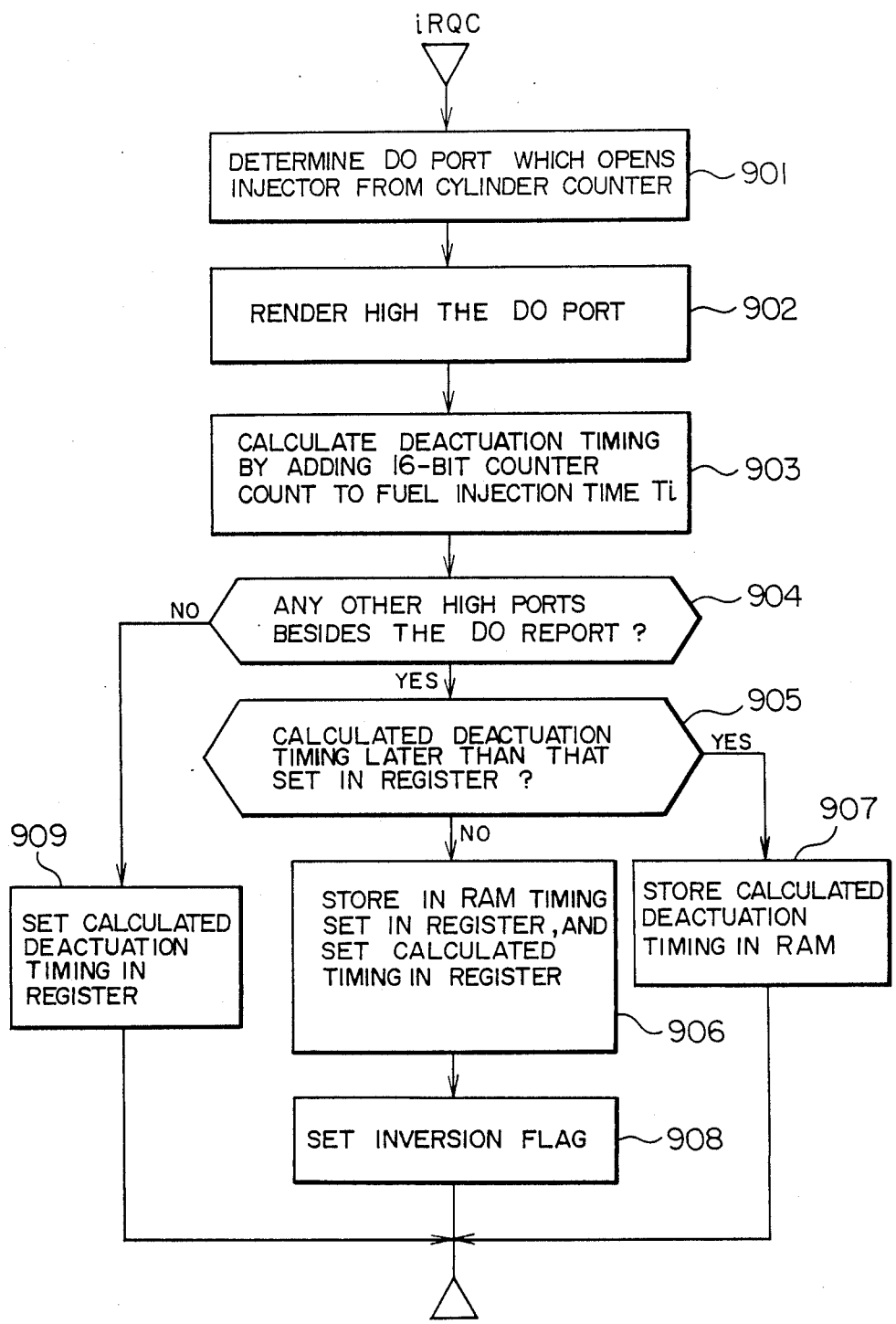
FIG. 9 is a flowchart indicative of an injection timing in the second embodiment.

FIG. 9 is a flowchart of operations performed after generation of interrupt iRQC. These operations include the determination of a port to be rendered High in order to open an injector and determination as to whether a time at which an injector controlled by the output compare register is deactuated is earlier or later than the set time. At step 901 the cylinder counter determines a DO port which actuates an injector. At step 902 the DO port is rendered High. At step 903 the time at which the injector for which the DO port is rendered High is deactuated is calculated. At step 904 it is checked whether there are any other High DO ports in order to check if there are corresponding injectors under injection in addition to the DO port rendered High this time. If not, control passes to step 909. If so, control passes to step 905. At step 909 the calculated rendering-Low time is set in the 16-bit register. At step 907 the corresponding RAM port is rendered Low. At step 905 it is determined whether the calculated rendering-Low time is later than the set time. If so, control passes to step 907 while, if not, control passes to step 906 where the time set in the register is restored in the RAM and the calculated time is set in the register. At step 908 the order of deactuation is different from the normal one, so that an inversion flag is set. If the order of deactuation is normal, the rendering-Low time calculated at step 907 is stored in the RAM.

Figure 10:
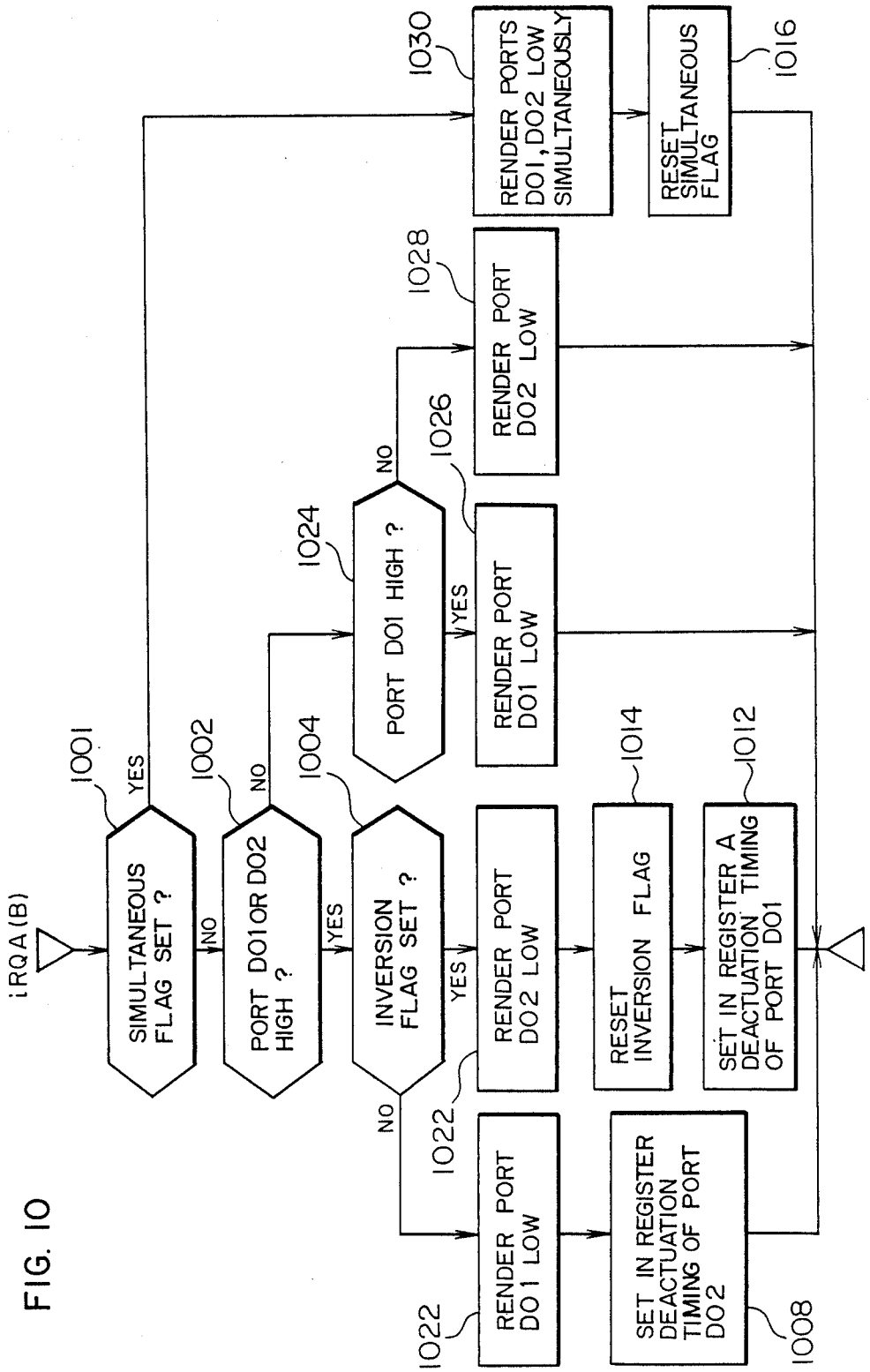
FIG. 10 is a flowchart of an interruption sequence initiated by a coincidence signal from a compare register in the second embodiment.

FIG. 10 shows a flowchart of a control sequence initiated by interrupt signal iRQA or iRQB generated when the register value set in FIG. 9 and the count of the 16-bit counter coincide. The flowcharts of the sequences started by iRQA and iRQB are substantially the same in content except for injectors to be operated. The flowchart for interrupt iRQA will therefore be here explained. At step 1001 it is checked whether a simultaneous flag is set for the time at which injectors #1 and #2 are deactuated simultaneously. If not, it is determined at step 1002 whether either one of RAM ports 1 and 2 is High. If so at step 1002, it is checked whether an inversion flag is set at step 1004. If the inversion flag is not set, port D01 is rendered Low at step 1022 and the time at which port D02 is rendered Low is set in register A at step 1008. If the inversion flag is set at step 1004, port D02 is rendered Low at step 1022, and the inversion flag is reset at step 1014. The time at which port D01 is rendered Low is set in register A at step 1012. If port D01 or D02 is High at step 1002, control passes to step 1024 where it is determined whether D01 is High. If so, port D01 is rendered Low at step 1026 and, if not, port D02 is rendered Low at step 1028. If the simultaneous flag is set at step 1001, ports D01 and D02 are rendered Low simultaneously at step 1030 and the simultaneous flag is reset at step 1016.

A third embodiment of the present invention will now be described with reference to FIGS. 11-15. In the third embodiment, three output compare registers and a data transfer controller are used to perform deactuation in hardware. Alternatively, two output compare registers may be used to provide control as in the first embodiment.

The present control apparatus includes a microprocessor (CPU) 1101, a ROM 1102, a RAM 1103, output compare registers 1104, 1105 and 1106 and a digital output (DO) port unit 1140. CPU 1101 receives the outputs of a crank angle sensor 1171, an air flow sensor 1172 and a water temperature sensor 1173 and performs calculations on these data in accordance with a program stored in ROM 1102. Output compare register 1104 includes a 8-bit counter C, a register C and a comparator C; output compare register 1105 includes a 16-bit counter B, a register B and a comparator B; and output compare register 1106 includes a 16-bit counter A, a register A and a comparator A. 8-bit counter C receives as a clock signal POS pulses indicative of a rotational angle of the engine. Register A receives reference angle signals or REF pulses corresponding to the number of cylinders (in the described embodiment, four cylinders). An interrupt signal iRQD is inputted to an interrupt controller 1150 in response to each REF pulse. The interrupt controller has a data transfer controller (DTC) 1160 which has a function equivalent to a direct memory access and a data transfer enable register (DTE) 1151 for determining whether DTC should be started if an interrupt signal is received. DTC 1160 includes a mode register (not shown) which indicates either byte or word transfers and a DTC register 1161 which represents a transfer source address, a transfer destination address and a transfer counter. RAM 1103 includes, corresponding to the DO port unit for actuating and deactuating the injectors, channel register Data 1142 for storing information necessary for transfer to RAM port 1141 and DTC register 1161 and information such as the RAM port address of a transfer source, DO port address of a transfer destination and data of the transfer counter, etc. Output compare register 1106 is associated with DO ports D01 and D02 to control actuators #1 and #2 and RAM ports 1 and 2, and output compare register 1105 is associated with DO ports D03 and D04 to control actuators #3 and #4 and RAM ports 3 and 4. Output compare registers 1104, 1105 and 1106 generate interrupt signals iRQC, iRQB and iRQA, respectively, and deliver them to interrupt controller 1150 when the two inputs to the respective comparators C, B and A of the output compare registers match.

Figure 11:
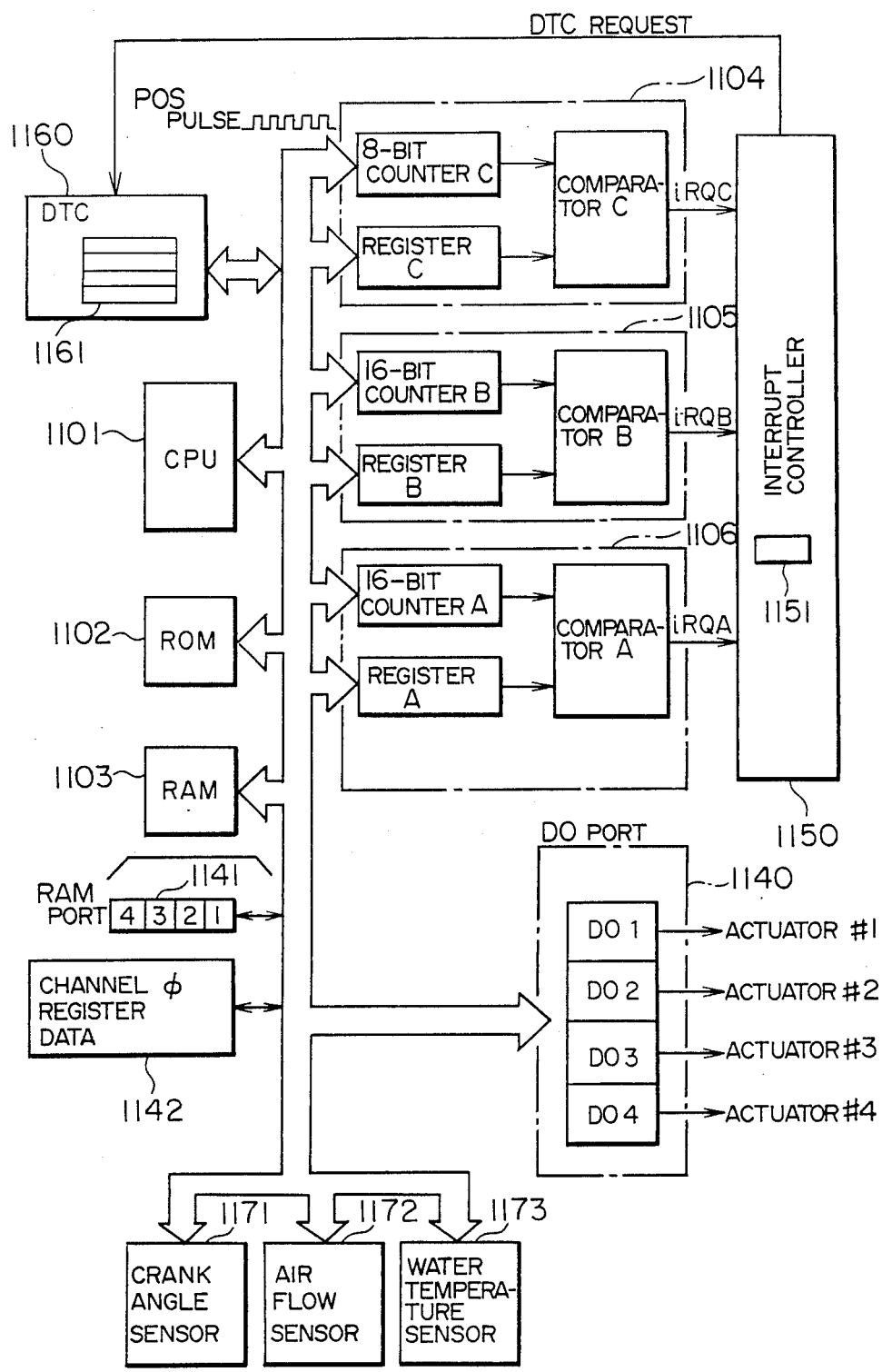
FIG. 11 illustrates a third embodiment having registers with a DTC function of the present invention.
Figure 12:
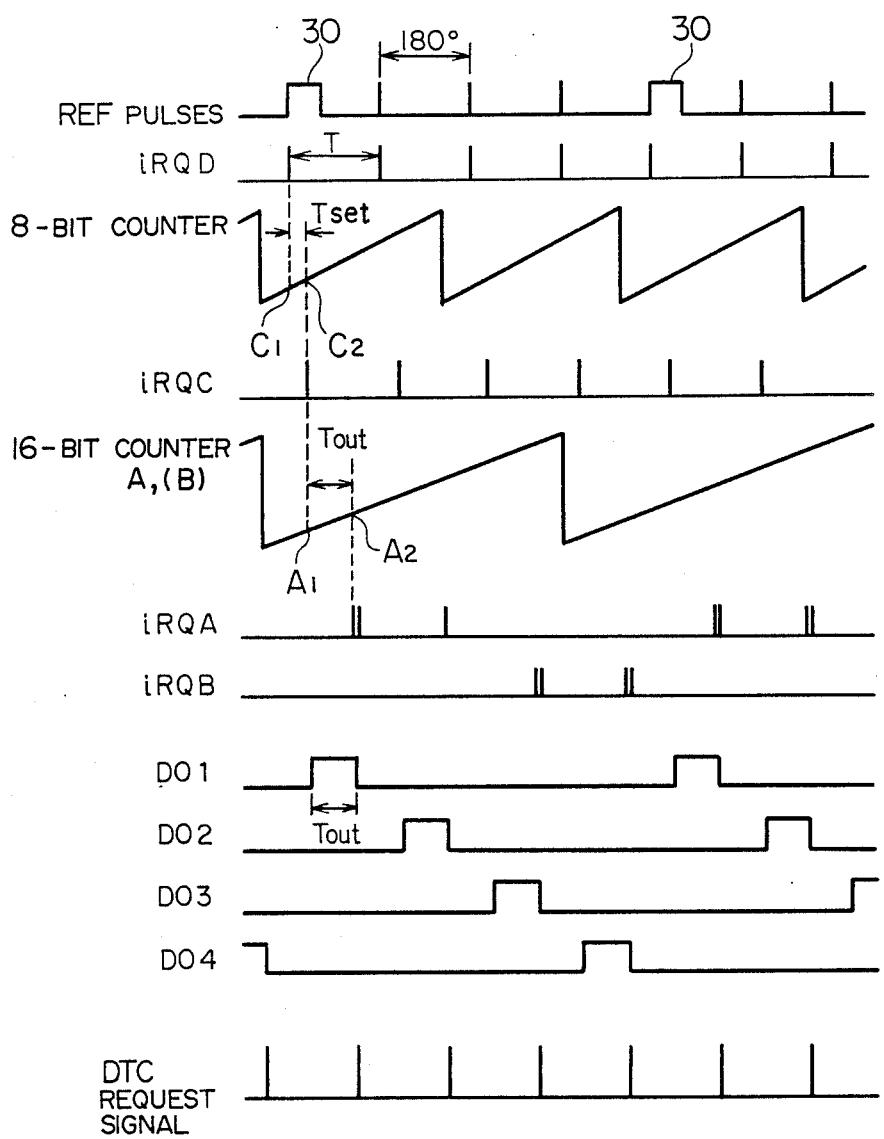
FIG. 12 is a sequence diagram explaining the operation of the third embodiment.

The operation of the embodiment will now be described with reference to FIG. 12. A reference angle signal REF pulse is generated at angular intervals of 180° in the case of a 4-cylinder engine and a cylinder determining signal 30 of a wider pulse width is generated at angular intervals of 720°. This cylinder determining signal determines an actuator for each cylinder to be driven. A rise of this REF pulse causes an interrupt iRQD to rise. By the measurement of the period T of interrupt iRQD, engine speed N is calculated. A count value C2 obtained by adding the current count C1 of 8-bit counter C to the drive start time Tset of the actuator counted from the interrupt iRQD is set in register C. Thus output compare register 1104 generates an interrupt iRQC when the two inputs to comparator match to thereby drive an actuator If the REF pulse is a cylinder determining signal, DO port D01 which drives the actuator #1 is rendered High. Simultaneously, the bit of RAM port 1 corresponding to DO port D01 is rendered High. When iRQC is generated, the count A1 of the 16-bit counter is added to a value Tout obtained on the basis of engine speed N and engine load Q/N to obtain a count value A2, which is set in register A. The value A2 represents a time at which injector #1 is to be deactuated. When the value A2 is calculated, times at which other injectors under injection are deactuated are checked and a bit in RAM 1103 corresponding to the injector which is to be deactuated earliest is rendered Low. In FIG. 11, the bit of RAM port 1 for injector #1 is rendered Low. The iRQA bit of data transfer enable register 1151 is enabled such that a DTC request signal is generated in response to interrupt iRQA which generates a coincidence signal. Thus the interrupt iRQA generated when the count of 16-bit counter A becomes A2, and hence a DTC request signal starts the DTC, and the hardware reads register information in channel 0 and the value of the RAM port is transferred to the DO port. By this transfer, injector #1 is deactuated to stop injection. When this transfer of data of one byte is terminated, interrupt signal iRQA rises again, so that the bit of the enable register 1151 is disabled. Thus the deactuation of the injector is performed by hardware, so that fuel injection is possible without errors in deactuation. Control of deactuation of injectors #3 and #4 due to interrupt iRQB can be performed similarly.

Figure 13:
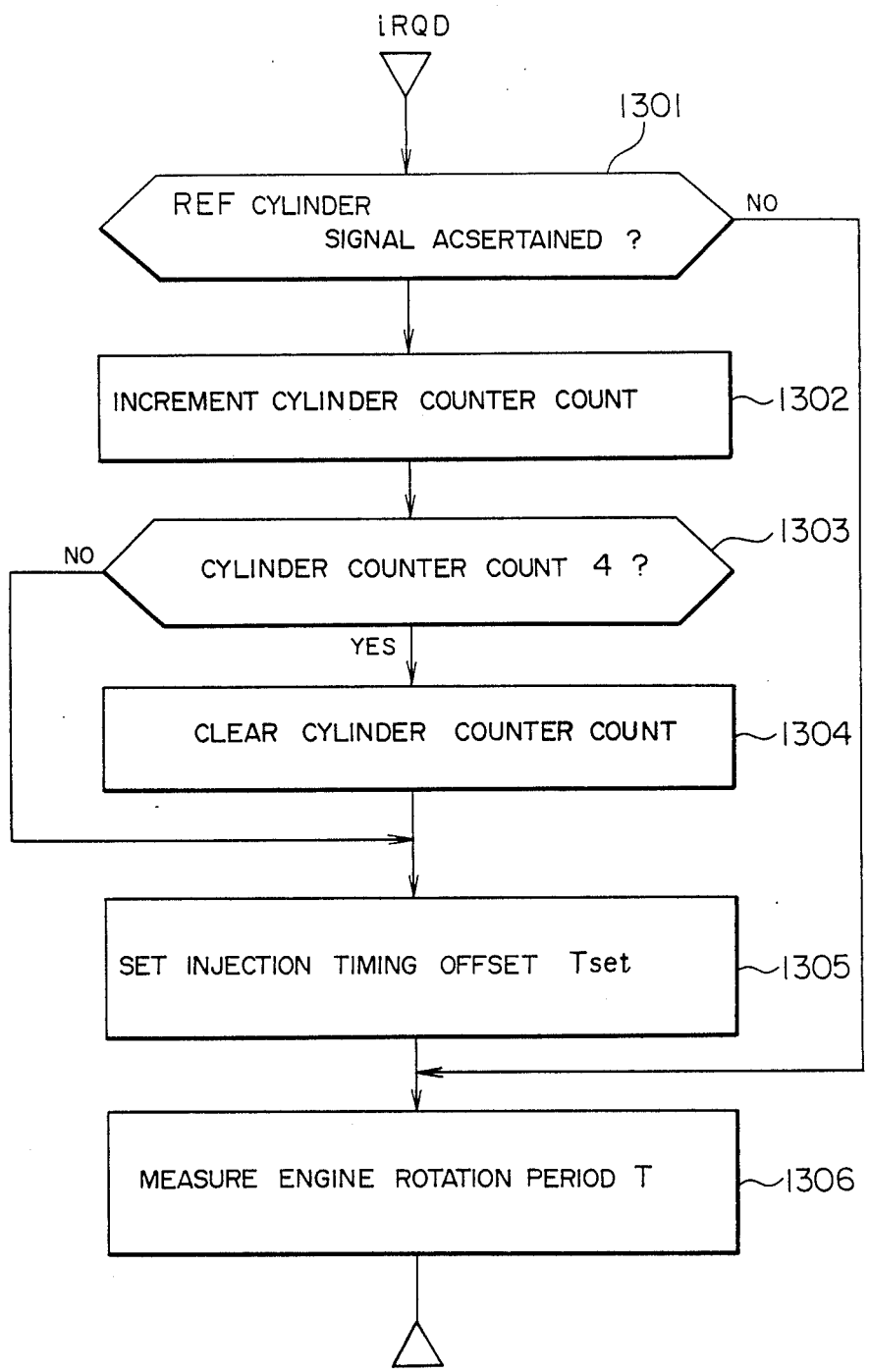
FIG. 13 is a flowchart of an interruption sequence initiated by a REF pulse.
Figure 14:
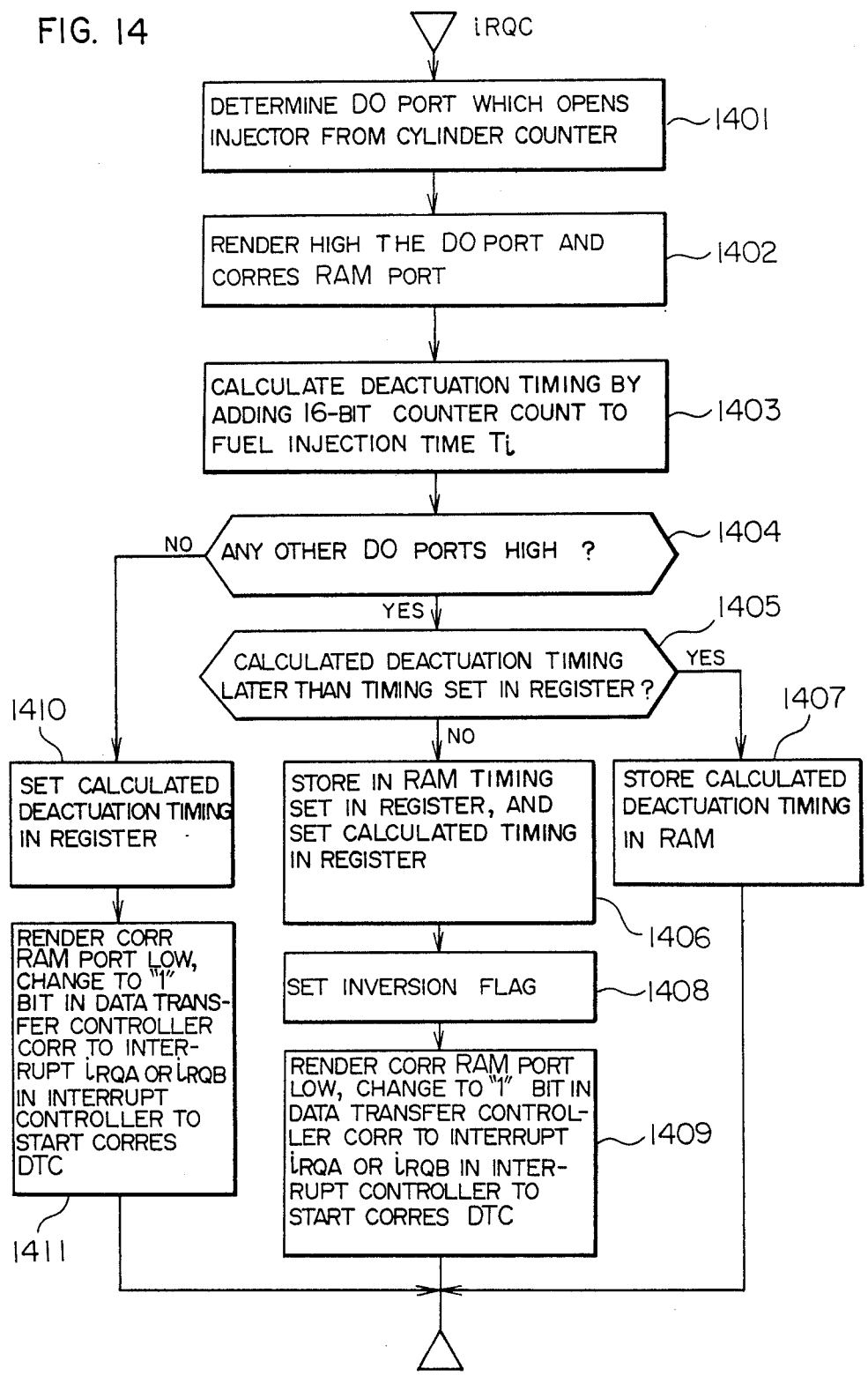
FIG. 14 is a flowchart of an interruption sequence explaining an actuation of actuators in the third embodiment.
Figure 15:
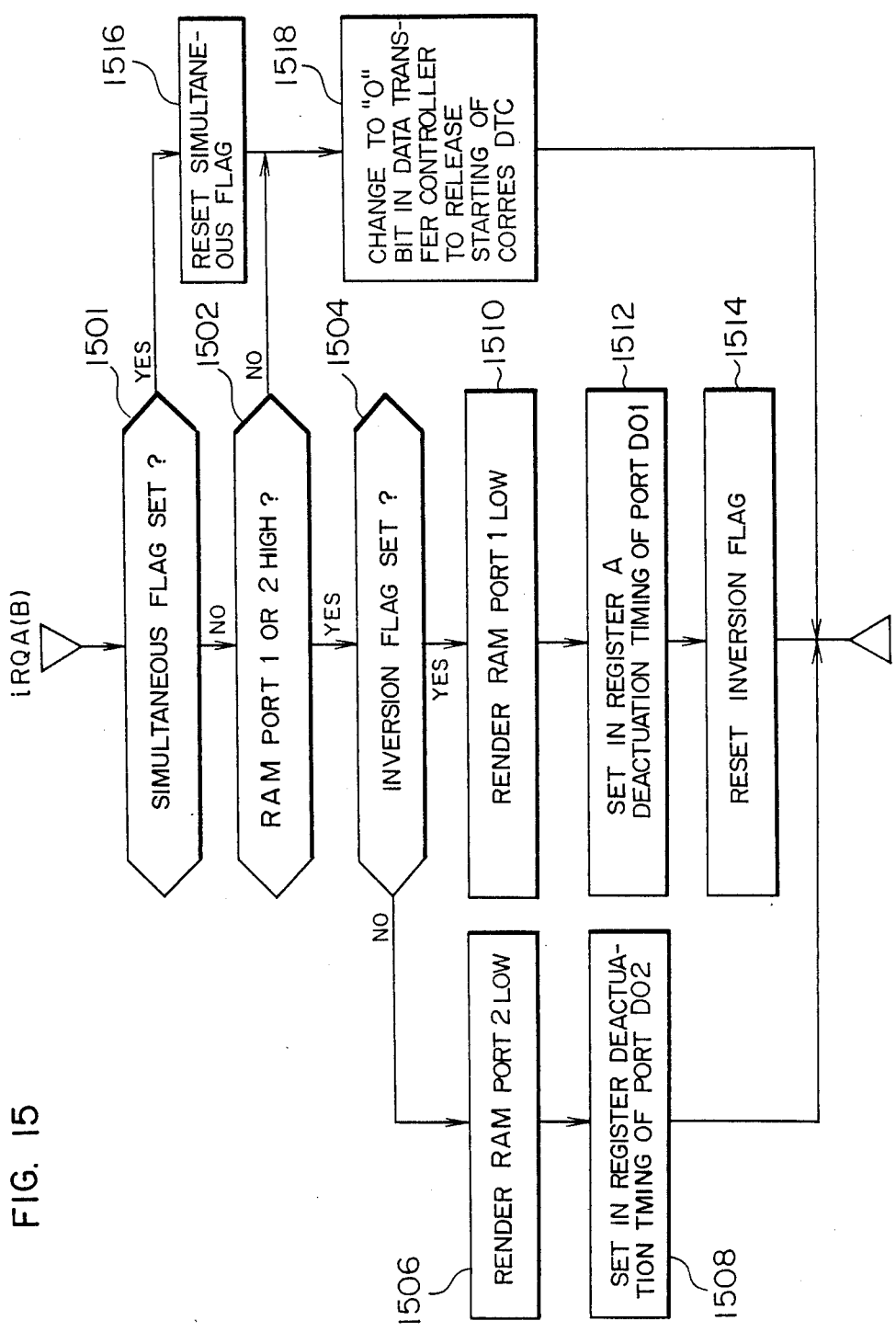
FIG. 15 is a flowchart of an interruption sequence initiated by a coincidence signal from a compare register in the third embodiment.

The operation of the embodiment described with reference to FIG. 12 will now be described with reference to flowcharts of FIGS. 13–15, FIG. 13 illustrates a flowchart of operations initiated by interrupt iRQD generated in response to a rise of a REF pulse. At step 1301 processing for determining a cylinder determining signal (FIG. 12) is performed. If the reference cylinder has been determined, the count of the cylinder counter is incremented in response to each interrupt signal at step 1302 and control passes to step 1303 where it is determined whether the cylinder counter is 4 in the case of a 4-clinder engine. If so, the next cylinder determining signal is obtained, so that the cylinder counter is cleared at step 1304. The cylinder counter determines an actuator to be actuated. If the cylinder counter counts are 0 and 1, interrupt iRQA is used, and if cylinder counter counts are 2 and 3, an interrupt iRQB is used. At step 1305 an offset Tset to drive an actuator, started from the REF pulse, is set in 8-bit register C. By this setting, an interrupt iRQC to be described in FIG. 14 is generated. At step 1306 the period of engine rotation T is measured. Setting offset Tset at step 1305 may be performed before step 1302 if the setting is not related to the cylinders.

FIG. 14 is a flowchart of operations initiated by interrupt iRQC. The operations here include steps to determine a port to actuate an actuator, to determine the arrival of times at which actuators controlled by the output compare register are deactuated, and to start the DTC. At step 1401 a DO port to actuate an actuator is determined by the count of the cylinder counter. At step 1402 the DO port is rendered High and the corresponding RAM port is also rendered High. At step 1403 a time is calculated at which the injector for which the DO port is rendered High is deactuated. At step 1404 it is determined whether there are any other High DO ports in order to check if there are corresponding actuators under operation in addition to the above-mentioned rendered-High DO port. If not, control passes to step 1410. Otherwise, control passes to step 1405. At step 1410 data of the calculated time for rendering Low is set in the 16-bit register. At step 1411 the corresponding RAM port is rendered Low, the bit of the data transfer controller corresponding to interrupt iROA or iROB is set to "1" in the interrupt controller to thereby drive the appropriate DTC. The bit of the DTC enable register 1151 is enabled. At step 1405 if the calculated rendering-Low time is later than the set time, control passes to step 1407. If the calculated rendering-Low time is earlier than the set time, control passes to step 1406 where the time set in the register is stored in the RAM and the calculated time is set in the register. Of course, the bit of the RAM port corresponding to the time stored in the RAM is rendered High. At step 1408 an inversion flag is set because the order of deactuation is different from the normal one. At step 1409 the bit of the RAM port corresponding to the time data set in the register is rendered Low, and the bit value in the data transfer controller corresponding to iRQA or iRQB is changed to "1" in the interrupt controller to thereby start the appropriate DTC. If the order of deactuation is normal, the calculated rendering-Low time is stored in the RAM at step 1407.

FIG. 15 shows a flowchart of operations initiated by an interrupt iRQA or iRQB generated when the value set in the register in FIG. 14 and the count of the 16-bit counter coincide. The flowcharts on iRQA and iRQB are substantially the same in content except for injectors to be operated. The flowchart on interrupt iRQA will therefore be described here. At step 1501 a simultaneous flag is checked which is for the time at which actuators #1 and #2 should be deactuated simultaneously. If the simultaneous flag is not set, it is checked whether either one of the controlled RAM port 1 or 2 is High at step 1502. If so, it is checked whether the inversion flag is set at step 1504. If no, the deactuation is a normal one, so that RAM port 2 is rendered Low at step 1506. At step 1508 the time at which the port D02 is rendered Low is set in register A. If the inversion flag is set at step 1504, RAM port 1 is rendered Low at step 1510 because the order of rendering D01 and D02 Low is reversed. At step 1512 the time at which the port D0l is rendered Low is set in register A and the inversion flag is reset at step 1514. If the simultaneous flag is set at step 1501, it is reset at step 1516 and the start of DTC is released at step 1518. At step 1502 if both of RAM ports 1 and 2 are Low, actuators #1 and #2 are at rest, so that control passes to step 1518 where the bit used in the data transfer controller is changed to "0" to thereby release the starting of the appropriate DTC.

While the embodiment in which the actuation of injectors is performed by software and the deactuation is performed by hardware has been described, the deactuation of the injectors can be performed by hardware according to the particular embodiment, so that the time at which the injectors are deactuated will not be delayed due to an interruption having a higher priority level and therefore control of the actuators is ensured.

Alternatively, the actuation of the injectors may be performed by hardware and the deactuation of the injectors may be performed by software. Both of the actuation and the deactuation of the injectors may be performed by hardware.

According to the present invention, since a single output compare register may control a plurality of actuators, the microcomputer is operated efficiently and a number of the output compare registers can be saved. Therefore, the saved output compare registers can additionally fulfill other control functions and a reduced number of output compare registers can realize a high function control.

What we claim is:

1. A control apparatus for controlling a plurality of actuators for an internal combustion engine, comprising:
   at least one sensor for sensing an operating condition of the internal combustion engine;
   a controller for calculating respective values of control timing in a sequence of control timings at which respective ones of said plurality of actuators are to be controlled in accordance with the sensed operating condition of the internal combustion engine;
   means for storing respective values of control timing calculated by said controller; and
   compare register means connected to a pulse signal source for counting pulse signals and for outputting a control signal to said controller when a predetermined relationship is achieved between a calculated value of control timing held therein and the count value of said pulse signals;
   wherein said controller is responsive to receipt of a control signal from said compare register means for controlling an actuator associated with the calculated value of control timing held in said compare register means and for replacing the calculated value of control timing held in said compare register means with the earliest value of control timing stored in said storing means.

2. A control apparatus according to claim 1, wherein said compare register means includes at least one compare register unit having a counter, a compare register for holding a calculated value of control timing and a comparator having respective inputs connected to said counter and said compare register.

3. A control apparatus according to claim 1, wherein said compare register means includes a plural number of compare register units, which number is less than the number of actuators to be controlled, each compare register unit having a counter, a compare register for holding a calculated value of control timing and a comparator having respective inputs connected to said counter and said compare register.

4. A control apparatus according to claim 1, wherein said storing means also stores information identifying the actuator associated with a calculated value of control timing held in said compare register means, and said controller reads out said information upon receipt of a control signal to determine the actuator to be controlled.

5. A control apparatus according to claim 1, wherein said compare register means includes a first compare register unit and a second compare register unit, each of said first and second compare register units having a counter for counting said pulse signals, a compare register for holding a calculated value of control timing and a comparator having respective inputs connected to said counter and said compare register, said controller being responsive to a control signal from said first compare register unit for actuating one of said actuators and being responsive to a control signal from said second compare register unit for deactuating one of said actuators.

6. A control apparatus according to claim 5, wherein said storing means also stores information identifying the actuator associated with a calculated value of control timing held in said compare register means, and said controller reads out said information upon receipt of a control signal to determine the actuator to be controlled.

7. A control apparatus for controlling a plurality of actuators for an internal combustion engine, comprising:
   a controller for calculating respective count values representing control timings in a sequence of control timings at which respective ones of said plurality of actuators are to be controlled;
   storing means for storing said respective count values associated with different actuators as they are calculated by said controller along with information identifying an actuator associated with each count value; and a number of compare register units, said number being less than the number of actuators to be controlled, each compare register unit having a counter connected to a pulse signal source for counting pulse signals, a compare register for holding a count value transferred from said storing means by said controller and a comparator connected to said counter and said compare register for outputting a control signal to said controller to cause said controller to control the actuator associated with the count value held in said compare register as identified by the information stored in said storing means and to transfer another count value from said storing means to a compare register in a compare register unit.

8. A control apparatus according to claim 7, wherein said controller includes means responsive to receipt of a control signal from a compare register unit for replacing the count value held in the compare register thereof with the count value representing the earliest control timing of the count values stored in said storing means.

9. A control apparatus according to claim 8, wherein said compare register units include a first compare register unit and a second compare register unit, said controller being responsive to a control signal from said first compare register unit for actuating one of said actuators and being responsive to a control signal from said second compare register unit for deactuating one of said actuators.

10. A control apparatus according to claim 7, wherein the counter in at least one of said compare register units is a modulo-N counter, the count value held in the compare register in the one compare register unit being calculated by said controller by adding an offset value to the state of said modulo-N counter at the time of receipt of a control signal by said controller.

11. A method of controlling a plurality of actuators in an internal combustion engine, comprising the steps of:
 (a) generating first control signals periodically in accordance with the rotation of the internal combustion engine;
 (b) counting pulse signals using a first counter to which pulse signals are supplied;
 (c) calculating count values in accordance with an operating condition of the internal combustion engine each time a first control signal is generated and storing said count values in a memory as they are calculated;
 (d) actuating a respective actuator each time a first control signal is generated;
 (e) reading out from said memory the earliest calculated count value stored therein, comparing the read-out count value to the count of said first counter and generating a second control signal when a predetermined relationship is detected between said read-out count value and the count of said first counter;
 (f) deactuating an actuator when a second control signal is generated; and
 (g) repeating steps (a) through (f) to actuate and deactuate said actuators in a predetermined sequence.

12. A method of controlling a plurality of actuators according to claim 11, wherein step (a) comprises:
 (a1) periodically generating a timing signal in synchronization with the rotation of the internal combustion engine;
 (a2) counting pulse signals using a second counter to which pulse signals are supplied;
 (a3) calculating a count value based on a predetermined offset value each time a timing signal is generated; and
 (a4) comparing each calculated count value to the count of said second counter and generating a first control signal when a predetermined relationship is detected between said calculated count value and the count of said second counter.

13. A method of controlling a plurality of actuators according to claim 11, wherein said first counter is a modulo-N counter, and wherein step (c) comprises:
 (c1) adding an offset value related to an operating condition of the engine to the count value of the counter at the time a first control signal is generated to obtain a calculated count value; and
 (c2) storing the calculated count value in said memory along with information identifying an actuator associated with that count value.

14. A method of controlling a plurality of actuators according to claim 11, wherein said step (d) comprises:
 (d1) identifying a respective actuator in accordance with the rotation of the internal combustion engine at the time a first control signal is generated; and
 (d2) actuating the identified actuator.

15. A method of controlling a plurality of actuators according to claim 11, wherein said step (f) comprises:
 (f1) reading out information from the memory which identifies the count value corresponding to the count of the first counter when a second control signal is generated; and
 (f2) deactuating the actuator indicated by the read-out information.

* * * * *